Oct. 21, 1930.    L. HAWKINS    1,779,362
BROODER
Filed May 9, 1929    2 Sheets-Sheet 1
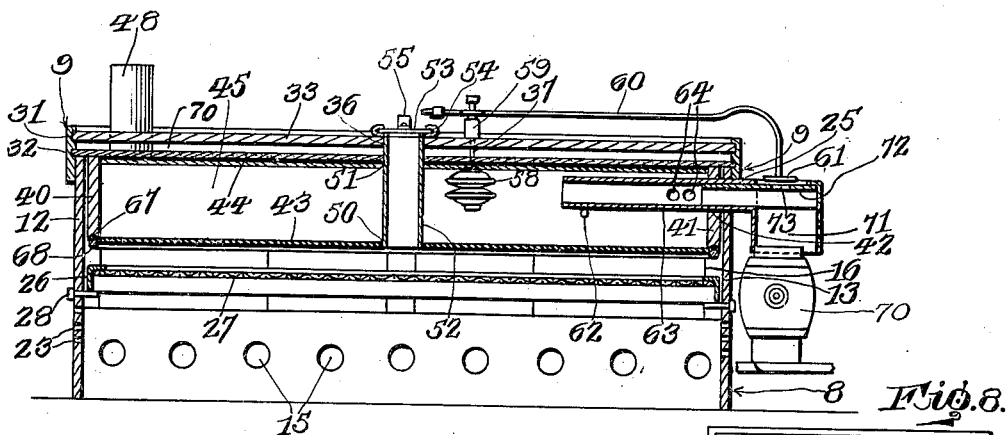
Fig.1.
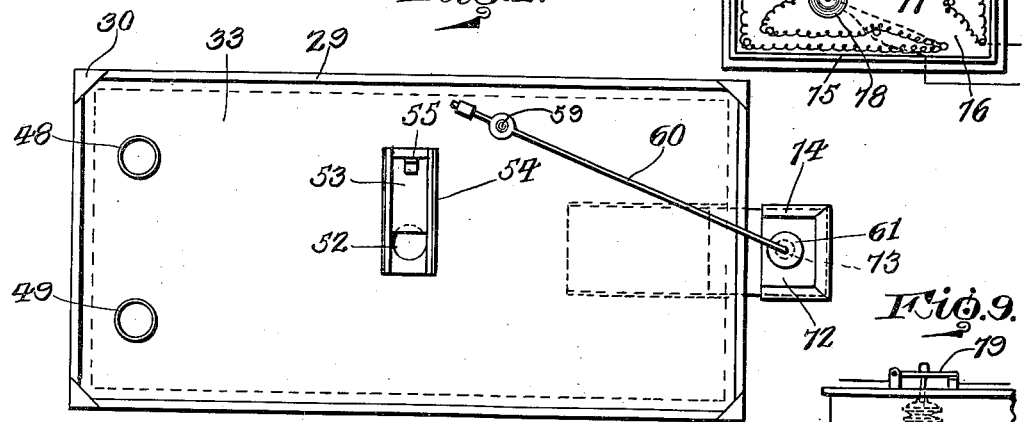
Fig.2.
Fig.8.
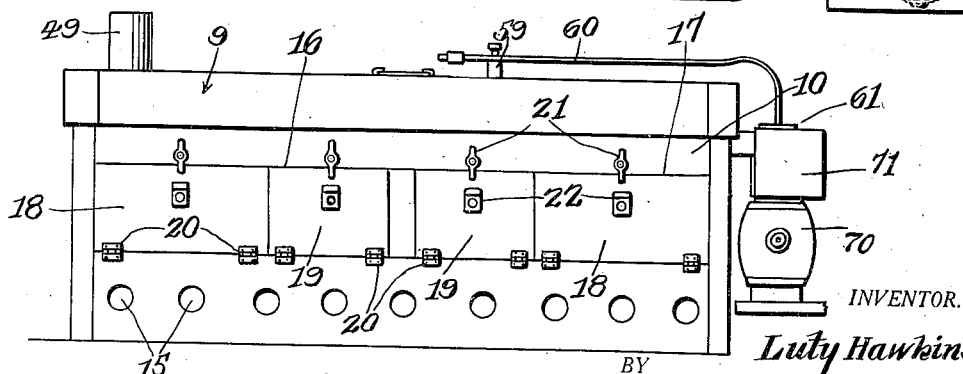
Fig.9.
Fig.3.
INVENTOR.
Luty Hawkins,
BY
Geo. P. Kimmel
ATTORNEY.

Oct. 21, 1930.        L. HAWKINS        1,779,362
BROODER
Filed May 9, 1929        2 Sheets-Sheet 2
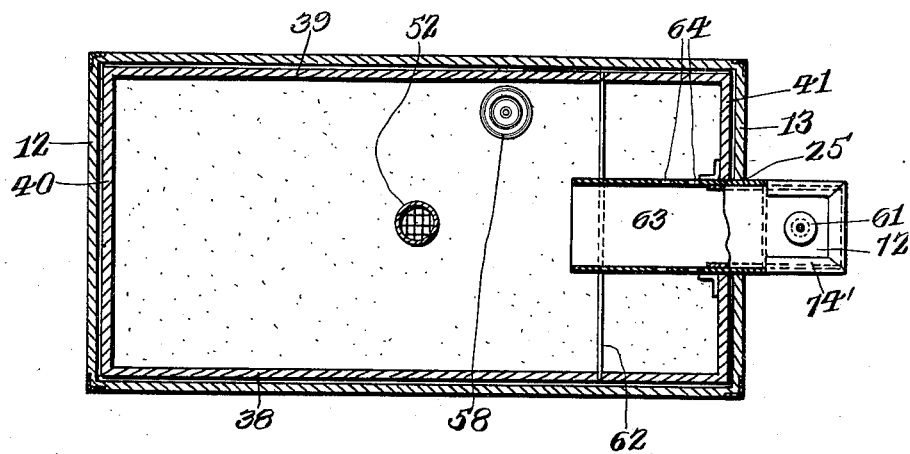
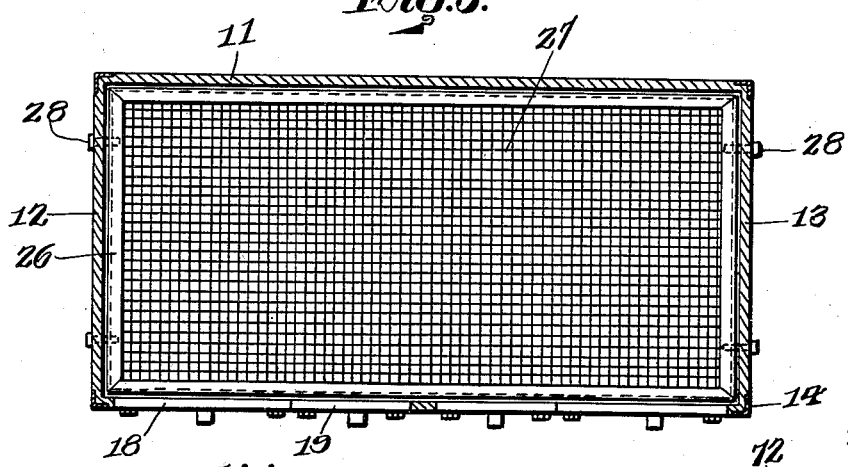
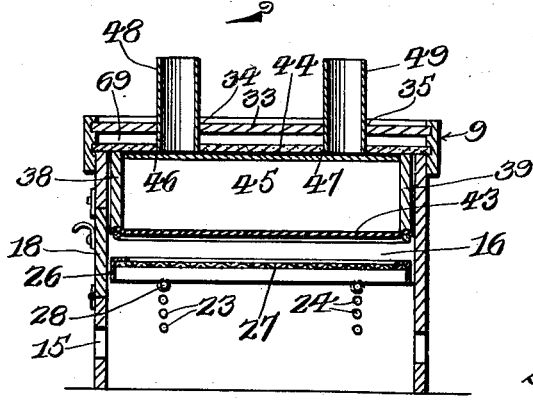
INVENTOR.
Luty Hawkins,
BY
Geo. P. Kimmel
ATTORNEY.

Patented Oct. 21, 1930

1,779,362

UNITED STATES PATENT OFFICE

LUTY HAWKINS, OF MOUNT VERNON, ILLINOIS

BROODER

Application filed May 9, 1929. Serial No. 361,773.

This invention relates to a brooder, and has for its object to provide, in a manner as hereinafter set forth, a device of the class referred to with means contacting with chicks for applying heat directly thereto, in a manner as when a hen is setting thereby expediting the brooding in accordance with the natural law.

A further object of the invention is to provide, in a manner as hereinafter set forth, a brooder having a vertically adjustable tray for supporting the chicks arranged below the heat applying or contact element, and whereby the adjusting of the tray relative to the heat applying or contact element will prevent the latter exerting too much pressure on the chicks.

A further object of the invention is to provide, in a manner as hereinafter set forth, a brooder with a heating element and with the latter including a resilient contact member for the chicks.

A further object of the invention is to provide, in a manner as hereinafter set forth, a brooder with a chick contacting element formed with a heating chamber and further providing the device with a new and improved means for supplying heated air to such chamber.

A further object of the invention is to provide, in a manner as hereinafter set forth, a brooder with a contacting element providing a heating chamber, a hot air supply means, a conveyor carried by such element, opening into the chamber and means for conducting heated air to the chamber, and with said means and conveyor constructed in a manner for detachably connecting them together whereby the contacting element can be readily separated from the heat supply means to provide for convenience when shipping.

A further object of the invention is to provide, in a manner as hereinafter set forth, a brooder having means to provide for the efficient ventilation of the brooding chamber.

A further object of the invention is to provide, in a manner as hereinafter set forth, a brooder including a chick contacting element providing in connection with a chick support a heating chamber and with the brooder further including means for the circulation of heated air through said chamber.

A further object of the invention is to provide, in a manner as hereinafter set forth, a brooder which is simple in its construction and arrangement, strong, durable, compact, thoroughly efficient in its use, readily assembled and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a longitudinal sectional view of a brooder in accordance with this invention.

Figure 2 is a top plan view thereof.

Figure 3 is a front elevation.

Figure 4 is a sectional plan through the contacting element.

Figure 5 is a sectional plan through the brooding chamber.

Figure 6 is a cross sectional view.

Figure 7 is a perspective view of the heat conveyor or conductor and heating element hood disassembled relative to each other.

Figure 8 is a top plan and Figure 9 a fragmentary view in side elevation of a modified form of contacting element.

A brooder, in accordance with this invention includes an open bottom and closed top rectangular housing formed of a body section which is open at its top and bottom and a hood section closing the top of the body section. The body and top sections are referred to generally at 8, 9 respectively.

The body section comprises a front wall 10, a rear wall 11 and a pair of end walls 12, 13. The walls are connected together by any suitable means and countersunk reinforcing strips 14 of angle-shape contour are positioned at the corners of and anchored in any suitable manner to said body section. The walls 10 and 11 are provided in proximity to the bottoms thereof with spaced air intake openings 15 for supplying air to the brooding chamber 16 provided by the body section in connection with a contact element and a tray to be presently referred to.

The wall 10 is formed with a pair of spaced openings 16, 17 and each of which is normally closed by a pair of hinged doors 18, 19. Each of the doors is connected with the wall 10 by a pair of hinges 20. The doors are detachably secured in closed position by pivoted latches 21 connected to the outer face of wall 10.

A finger or handle member 22, to facilitate the opening of a door, is secured to the outer face of each door.

The walls 12 and 13 are formed with two spaced sets of openings 23, 24. The openings of each set are arranged in a vertical row. The sets of openings formed in the wall 12 are arranged in alignment with the sets of openings formed in the wall 13. The openings of said sets are of materially less diameter than the openings 15. The purpose of the sets of openings will be presently referred to. The wall 13 in proximity to its top edge and centrally thereof is formed with a rectangular slot 25 of suitable dimensions, for a purpose to be presently referred to.

The bottom of the brooding chamber 16 is formed by a vertically adjustable tray consisting of a rectangular frame 26 and a length of reticulated, metallic fabric 27 closing the opening formed by the frame. The body of frame 26 is of angle-shaped cross section to form a vertical portion and a horizontal portion and with the horizontal portion extending inwardly from the upper end of the vertical portion. The reticulated fabric 27 is secured to the lower face of the horizontal portion. The chicks are mounted on the reticulated fabric 27 during brooding. The tray is supported upon vertically adjustable pins 28 which are selectively mounted in the sets of openings 23 and 24 for the purpose of raising or lowering the tray to the position desired. The tray is at all times positioned above the openings 15, that is to say, the reticulated fabric 27 of the tray is arranged in such position.

The hood section 9 includes a frame 29 having reinforcing corner pieces 30. The inner face of frame 29 is grooved as at 31 and also as at 32. The groove 31 is arranged above the groove 32 but in proximity to the top edge of frame 29. Seated in the groove 31 is a closure 33 for the opening provided by the frame 29 and said closure 33 forms the top of the hood section. The frame 29 is of slightly greater dimensions than the body section and has its inner face, below the groove 32 positioned against the outer face of the body section 8. The closure 33 is provided with a pair of spaced openings 34, 35 in proximity to one end thereof. The closure 33 centrally thereof is formed with an opening 36. Adjacent and to one side of the opening 36 is an opening 37 and the purpose of the openings 34, 35, 36 and 37 will be presently referred to.

The chick contacting element is of rectangular contour and comprises a front wall 38, a rear wall 39 and a pair of end walls 40, 41. The end wall 41 is formed with a slot 42 for registering with the slot 25 formed in the end wall 13 of the body section of the housing. The chick contacting element further includes a bottom wall 43 of flexible material and a top wall 44 of insulation material having a lining of asbestos paper 44'. The top wall 44 is of greater area than the bottom wall 43, is seated upon the top edges of the front, rear and end walls 38, 39, 40 and 41 respectively, projects laterally from said walls, seats on the top edge of the body section 8 and extends into groove 32 formed in the inner face of the frame 29. The top wall 44 further seals the space formed between the body section 8 and the contacting element. Preferably the lining 44' as shown is of such size to abut against the inner faces of the walls 38, 39 and 40.

The construction of the contacting element as referred to provides a chamber 45 for the reception of heated air to heat the flexible bottom 43 which is adapted to contact with the chicks. The top of the chamber 45 provided by the wall 44 is formed with a pair of openings 46, 47 which register with the openings 34, 35 and connected to the walls of the openings 46, 47 and extending through the openings 34, 35 are heated air discharge pipes 48, 49 respectively which project a substantial distance above the closure 33. The bottom of the chamber 45, which is formed by the flexible member 43 is provided with a central opening 50, aligning with a central opening 51 formed in the top wall 44 of the chamber 45. The opening 51 aligns with the opening 36. Connected to the wall of the opening 50, and extending through the openings 51 and 36 is a ventilating tube 52, having its upper end controlled by a slide 53 mounted in the guide members 54 which are secured upon the upper face of the closure 33. The slide 53 has a finger piece 55.

Suspended from the top wall 44, of the chamber 45 is a thermostatic element 58 which extends through the opening 37 to a point a substantial distance above the closure 33 and that portion of the element 58 above closure 33 provides a fulcrum 59 for the counter-balanced stem 60 of a damper member 61, and the purpose of the latter will be presently referred to. That portion of the element 58 which provides for a fulcrum 59 further constitutes a means for shifting the stem 60 against the action of its counterweight when the thermostatic element 58 is expanded.

Secured to the walls 38, 39 of the contacting element and extending across the chamber 45 adjacent the end wall 41 is a support 62 for the inner end of a heat conveyor, chute or flue 63 of rectangular cross section. The conveyor or conductor 63 extends outwardly through slots 25 and 42. The sides of the conveyor 63 are provided with outlet openings 64.

The outer end of the conveyor has its bottom provided with a depending flange 65 for a purpose to be hereinafter referred to. The flange 65 is spaced a substantial distance from wall 13. The conveyor 63 has its sides provided with angle irons 65′ secured to wall 41.

The flexible bottom 43 of the chamber 45 has the marginal portion thereof extended into grooves 67 formed in the bottom edges of the walls 38, 39, 40 and 41 and a binding member 68 is positioned against such marginal portion and suitably secured to such walls for maintaining the resilient bottom 43 against the walls. The member 68 is in the form of a rectangular frame having its body of semi-circular cross section. The top 44 of the chamber 45 is spaced from the closure 33 of the hood section 9 to provide an air chamber 69 constituting an insulating medium for the top of chamber 45.

Positioned adjacent one end of the housing is a heater element 70 and arranged thereabove is a hood member referred to generally at 71 providing what may be termed an air heating chamber and the heated air from the latter is conducted by the conveyor 63 into the chamber 45. With reference to Figure 7 the hood includes an inverted, channel-shaped section 72 provided with an opening 73 which is controlled by the damper 61. The hood 70 further includes a body section 74 consisting of a front and a rear portion and an outer side portion and each of which has an inwardly extending flange 74′ at its top which seats on the upper face of the section 72. The section 74 depends a substantial distance below section 72 and is secured to the latter by holdfast means, as indicated at 75. The width of section 72 with respect to section 74 is such that it will project inwardly therefrom. The projecting portion of section 72 is adapted to detachably engage in the outer end of the conveyor 63. The flange 65 of the conveyor forms the inner side portion of body section 74. By this arrangement the contacting element is detachably connected to the hood thereby providing for convenient shipping.

The body section 73, in connection with flange 65 encloses the upper portion of heater element 69. The body section 73 is to be positioned a suitable distance from the wall 13, preferably about four inches therefrom and the length of the conveyor will be such as to provide for such spacing arrangement.

In the modified form of contact element 75 shown in Figures 8 and 9 chamber 76 thereof is heated from a series of electrical heating elements 77 extending around such chamber and in circuit with a source of electrical energy. The thermostat 78 within chamber 76 is adapted to operate a circuit opening device 79 mounted on cover section 9, when the temperature in the chamber 76 is above a predetermined point. The conveyor 63 is not used, nor the slots 25 and 42, as well as elements 69 and 70. Otherwise than as stated the form of the device shown in Figures 8 and 9 is to be the same as that illustrated in Figures 1 and 2.

It is thought that the many advantages of a brooder, in accordance with this invention can be readily understood, and although the preferred embodiment of the invention is as illustrated and described, yet it is to be understood that changes in the details of construction can be had which fall within the scope of the invention as claimed.

What I claim is:

1. In a brooder, a contact element providing a heating chamber, a heated air conveyor positioned within said chamber and open at each end, and a heating element hood providing an air heating chamber having an open inner side, said hood including means extending into the conveyor for supplying heated air thereto, said means frictionally engaging with the conveyor for detachably connecting it to the hood, said conveyor being flanged at its outer end to close the inner side of said chamber.

2. In a brooder, a contact element providing a heating chamber, a heated air conveyor positioned within said chamber and open at each end, and a heating element hood providing an air heating chamber open at its inner side, said hood including means extending into the conveyor for supplying heated air thereto, said means frictionally engaging with the conveyor for detachably connecting it to the hood, said conveyor having its sides provided with outlet openings and its outer end provided with means for closing the inner side of said chamber.

3. In a brooder, a contact element providing a heating chamber, a heated air conveyor positioned within said chamber and open at each end, a heating element hood providing an air heating chamber, said hood including means extending into the conveyor for supplying heated air thereto, said means frictionally engaging with the conveyor for detachably connecting it to the hood, and said conveyor having a depending flange at its outer end to abut said hood when the latter is connected to the conveyor.

4. In a brooder, a closed top housing, a chick contact element arranged within the upper portion of the housing and forming a heating chamber, said housing and chamber each having a wall thereof provided with a slot, said slots aligning, a heated air conveyor positioned within said heating chamber, open at each end, secured to the inner face of said wall of said chamber and projecting outwardly through said slots, a heating element hood abutting said element and providing an air heating chamber, said hood including means extending into the outer end of said conveyor for supplying heated air thereto, said means frictionally engaging with said conveyor for detachably connecting it to the hood, and said conveyor having its sides provided with outlet openings.

5. In a brooder, a housing consisting of a body section and a hood section, a chick supporting tray within said housing, supporting means therefor, a heated air receiving chick contacting element within and spaced from the walls of said housing and forming in connection with the latter and said tray a brooding chamber, said element including a top of insulation engaging in said hood section and closing the top of the space between said element and the walls of said housing, ventilating means for the brooding chamber and extending through said element and hood section, and a controlling slide for said ventilating means.

6. In a brooder, a housing consisting of a body section and a hood section connected to and extended above the top of the body section, and a heated air receiving chick contacting element positioned within and spaced from the walls of the housing, said element having its top extending across the top of the body section, engaging in said hood section and providing in connection with the latter an air chamber, said top of said element further closing the space between said element and the side walls of said housing.

7. In a brooder, an open bottom and closed top housing, a chick contacting element for supplying heat to the chicks, said element positioned within the upper portion of and spaced from the walls of the housing, said element having means engaging in opposed walls of the housing for closing the top of the space between said element and the opposed walls of the housing, a supporting tray for the chicks positioned below said element and in connection with the latter and opposed walls of the housing providing a brooding chamber, said housing having air intake openings below said tray, means for supporting the tray within the housing, and ventilating means for said chamber extending through said element and the closed top of the housing.

In testimony whereof, I affix my signature hereto.

LUTY HAWKINS.